UNITED STATES PATENT OFFICE.

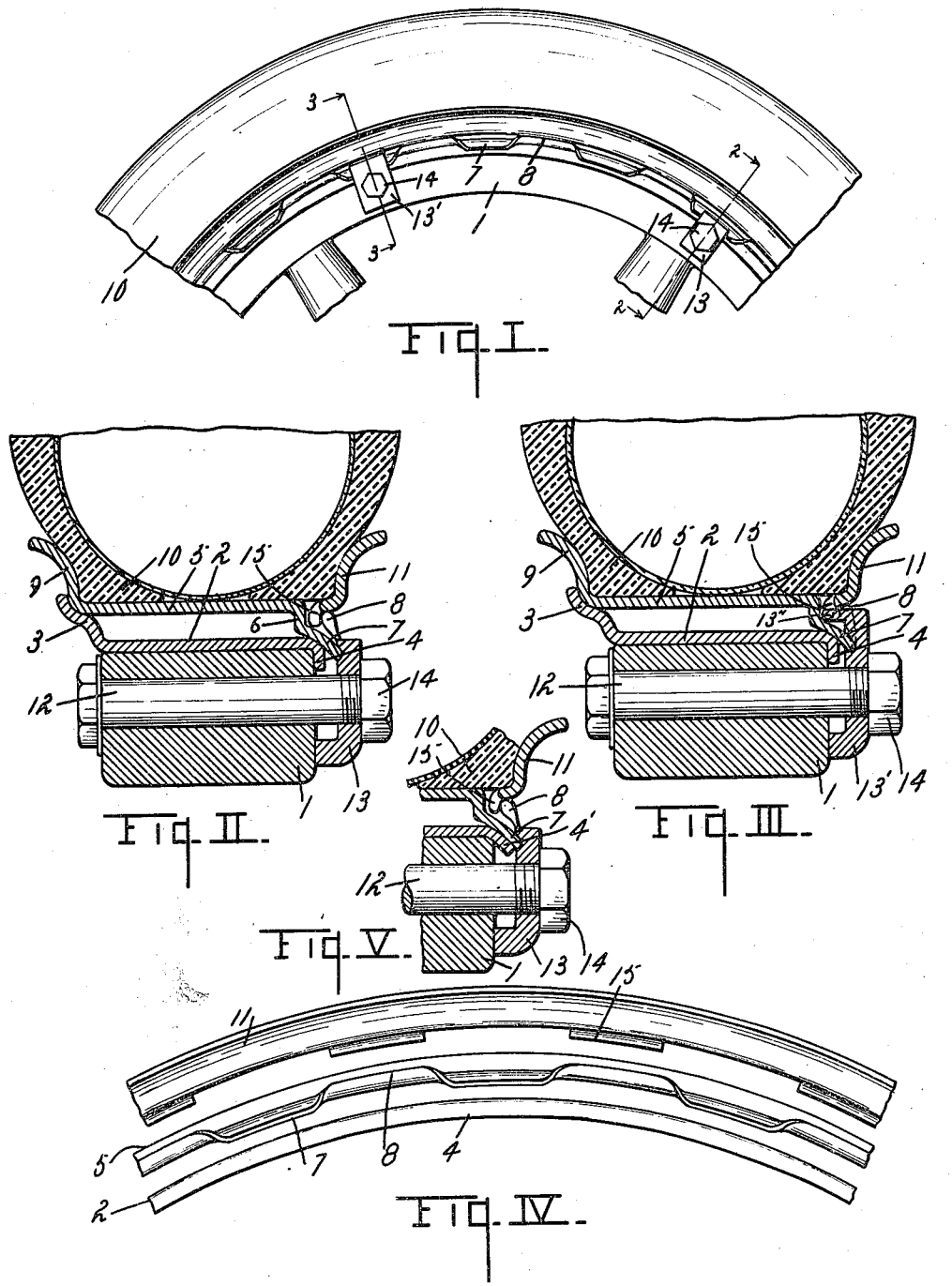

HERMAN W. MELLING, OF JACKSON, MICHIGAN.

DEMOUNTABLE RIM.

1,252,410.  Specification of Letters Patent.  Patented Jan. 8, 1918.

Application filed March 24, 1917. Serial No. 157,196.

*To all whom it may concern:*

Be it known that I, HERMAN W. MELLING, a citizen of the United States, residing at Jackson, county of Jackson, State of Michigan, have invented certain new and useful Improvements in Demountable Rims, of which the following is a specification.

This invention relates to improvements in demountable rims.

One of the objects of this invention is to provide means permitting the removal of the tire and rim together as a unit or permitting the removal of the tire and its replacement without demounting the rim and permitting the ready removal of the tire from the rim when the rim is demounted.

Further objects, and objects relating to details and economies of construction and operation will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this specification, in which:

Figure I is a side elevation of a wheel equipped with my improved demountable rim, portions of the wheel, tire and rim being broken away.

Fig. II is an enlarged sectional detail on lines 2—2 of Fig. I.

Fig. III is an enlarged detail section on line 3—3 of Fig. I.

Fig. IV is an enlarged side elevation of the parts of my improved rim, the parts being shown in a disassembled relation.

Fig. V is a sectional view corresponding to Fig. II, showing a modified form of my invention.

In the drawing similar reference characters refer to similar parts throughout the several views, and the sectional views are taken looking in the direction of the little arrows at the ends of the section lines.

Referring to the drawing, my improvements are illustrated as adapted to a vehicle wheel of the wooden type comprising a felly 1 with a felly band 2 fixed thereon. The felly band 2 is provided with an outwardly inclined rim flange 3 provided with a seat for the demountable rim. At its opposite edge the band 2 is provided with an inturned flange 4 engaging the edge of the felly.

The demountable rim 5 is adapted to seat in the flange 3 of the felly band and is provided with an inwardly-turned flange 6 having its edge conformed to provide inturned lug-like portions 7 and out-turned portions 8 disposed alternately, the edges of these portions being preferably united, as shown. The in-turned portions 7 are inclined and adapted to ride on the felly band, as shown in the drawing, so that when the rim clamping members are clamped up the rim is firmly seated.

The rim is provided with a fixed tire flange 9 at one edge for the tire 10 and a removable flange 11. Clamping bolts 12 are disposed through the felly to receive the clamping members 13 which engage the downturned lugs 7, as shown in Fig. II, forcing the rim firmly to its seat, when the nuts 14 are turned up.

The removable flange 11 is provided with spaced lugs 15 adapted to be introduced between the upturned lugs 8 of the rim and engaged therewith by rotative movement of the flange 11. One, or more, of the clamping members, as 13', are provided with inwardly projecting lugs 13'' which extend between adjacent lugs 15, as shown in Figs. I and III. When the clamping member 13' is secured in position rotative movement of the rim flange, or such rotative movement of the rim flange as would allow its disengagement is prevented by the lug or lugs 13''.

In the modification shown in Fig. V the flange 4' of the felly band is inclined instead of being turned at right angles, as at Fig. II, thus providing a more extended support for the lugs 7.

With the parts thus arranged, the rim is readily secured and released from the wheel and the tire readily secured to or released from the rim. The parts are comparatively simple and economical to produce and very convenient to assemble and disassemble.

I have not attempted to illustrate or describe various modifications or adaptations which might be desirable, as I believe the disclosure made will enable those skilled in the art to which my invention relates to embody or adapt the same as may be desired.

Having thus described my invention, what I claim as new and desire to secure by Letters Patent, is:

1. In a structure of the class described, the combination of a felly, a felly band thereon provided with an outwardly inclined rim seat flange at one edge and an inturned felly engaging flange at the other, a demountable rim seating in said rim seat and provided with an inturned flange having its edge conformed into alternate connected inwardly and outwardly extending lugs, the inwardly extending lugs being inclined and seating on said felly band, said rim being provided with a fixed tire flange, and a coacting removable tire flange provided with spaced inwardly projecting lugs adapted to be introduced between the said upturned lugs and engaged and disengaged therewith by a rotative movement, and clamping members mounted upon said felly, one of said clamping members being provided with an inwardly projecting lug extending between adjacent lugs of said removable tire flange.

2. In a structure of the class described, the combination of a felly, a felly band thereon provided with a rim seat at one edge, a demountable rim seating in said rim seat and provided with alternate inwardly and outwardly extending lugs, the inwardly extending lugs seating on said felly band, said rim being provided with a fixed tire flange and a coacting removable tire flange provided with spaced inwardly projecting lugs adapted to be introduced between the said upturned lugs and engaged and disengaged therewith by a rotative movement, and clamping members mounted upon said felly, one of said clamping members being provided with an inwardly projecting lug extending between adjacent lugs of said removable tire flange, all coacting for the purpose specified.

3. In a structure of the class described, the combination of a felly, a felly band thereon provided with a rim seat at one edge, a demountable rim seating in said rim seat and provided with alternate inwardly and outwardly extending lugs extending parallel with the edge of said felly, the inwardly extending lugs seating on said felly band, said rim being provided with a fixed tire flange and a coacting removable tire flange provided with spaced inwardly projecting lugs extending parallel with said rim lugs adapted to be introduced between the said upturned lugs and engaged and disengaged therewith by a rotative movement, and common clamping members mounted upon said felly for clamping said demountable rim and for preventing rotation of said removable flange, all coacting for the purpose specified.

4. In a structure of the class described, the combination of a felly, a felly band provided with a rim seat at one edge, a demountable rim seating in said rim seat and provided with inwardly inclined portions coacting with said felly band and with outwardly projecting lugs, said rim being provided with a removable tire flange having spaced lugs adapted to coact with the outwardly projecting lugs of said rim band, and common means for clamping said demountable rim and for preventing rotation of said removable flange.

5. In a structure of the class described, the combination of a felly, a felly band provided with a rim seat at one edge, a demountable rim seating in said rim seat and provided with inwardly inclined portions coacting with said felly band and with outwardly projecting lugs, said rim being provided with a removable tire flange having spaced lugs adapted to coact with the outwardly projecting lugs of said rim band, and common means for clamping said demountable rim and locking said tire flange.

In witness whereof, I have hereunto set my hand and seal in the presence of two witnesses.

HERMAN W. MELLING. [L. S.]

Witnesses:
 MICHAEL L. NOON,
 WILLIAM DAY.